United States Patent
Benedetti et al.

(10) Patent No.: US 8,925,711 B2
(45) Date of Patent: Jan. 6, 2015

(54) DEVICE AND METHOD FOR FEEDING METAL MATERIAL INTO A MELTING PLANT

(75) Inventors: Gianpietro Benedetti, Tricesimo (IT); Alfredo Poloni, Fogliano di Redipuglia (IT)

(73) Assignee: Danieli & C. Officine Meccaniche SpA, Buttrio (IT)

( * ) Notice: Subject to any disclaimer, the term of this patent is extended or adjusted under 35 U.S.C. 154(b) by 150 days.

(21) Appl. No.: 13/513,189

(22) PCT Filed: Dec. 1, 2010

(86) PCT No.: PCT/IB2010/003080
§ 371 (c)(1),
(2), (4) Date: May 31, 2012

(87) PCT Pub. No.: WO2011/067657
PCT Pub. Date: Jun. 9, 2011

(65) Prior Publication Data
US 2012/0234649 A1 Sep. 20, 2012

(30) Foreign Application Priority Data
Dec. 4, 2009 (IT) .................................. UD09A0223

(51) Int. Cl.
| | | |
|---|---|---|
| B65G 43/08 | (2006.01) | |
| F27B 3/18 | (2006.01) | |
| C21C 5/52 | (2006.01) | |
| F27D 3/10 | (2006.01) | |
| C21C 7/00 | (2006.01) | |
| F27B 3/06 | (2006.01) | |

(52) U.S. Cl.
CPC ............... *F27B 3/186* (2013.01); *C21C 5/527* (2013.01); *F27D 3/10* (2013.01); *C21C 7/0025* (2013.01); *C21C 2300/02* (2013.01); *F27B 3/06* (2013.01)
USPC .......................................... 198/523; 198/617

(58) Field of Classification Search
None
See application file for complete search history.

(56) References Cited

U.S. PATENT DOCUMENTS

| | | | |
|---|---|---|---|
| 3,211,304 A | | 10/1965 | Pottmeyer et al. |
| 4,764,102 A | * | 8/1988 | Takahashi ..................... 425/466 |
| 6,004,504 A | * | 12/1999 | Vallomy ......................... 266/79 |
| 7,648,551 B2 | * | 1/2010 | Sellan .......................... 75/10.62 |

FOREIGN PATENT DOCUMENTS

| | | |
|---|---|---|
| DE | 103 35 847 A1 | 2/2005 |
| WO | 2006/089868 A1 | 8/2006 |
| WO | 2006/089870 A2 | 8/2006 |

OTHER PUBLICATIONS

International Search Report from PCT/IB2010/003080 dated Apr. 6, 2011.

\* cited by examiner

*Primary Examiner* — Kavel Singh
(74) *Attorney, Agent, or Firm* — Novak Druce Connolly Bove + Quigg LLP (57) ABSTRACT

Device for feeding metal into melting plant, in particular into melting furnace including hearth and lateral aperture. Device includes means to feed metal terminally associated with a connection conveyor including a loading plane and cooperating with translation and positioning means. Connection conveyor able to assume first position during continuous loading step, wherein its front terminal end is located substantially flush with the furnace internal wall through the aperture, to introduce metal inside the furnace; a second position distanced from the furnace wall during the step of tapping liquid metal from the furnace; and a third position while first loading the furnace, with the furnace switched off, wherein its loading plane front end is inside the furnace volume to be disposed in proximity to the distal internal wall opposite the furnace proximal internal wall, to unload and distribute a charge to cover at least part of the furnace bottom surface.

16 Claims, 6 Drawing Sheets fig. 1 fig. 2 fig. 3 fig. 4 fig. 5 fig. 6 fig. 7

DEVICE AND METHOD FOR FEEDING METAL MATERIAL INTO A MELTING PLANT

CROSS-REFERENCE TO RELATED APPLICATIONS

This application is a §371 National Stage Application of International Application No. PCT/IB2010/003080, filed on 1 Dec. 2010, claiming the priority of Italian Patent Application No. UD2009A000223 filed on 4 Dec. 2009.

FIELD OF THE INVENTION

The present invention concerns a device and a method to feed metal material into a melting plant, particularly into an electric arc melting furnace, of the type which uses a loading system with introduction of the charge from one side of the furnace.

In particular, the invention concerns the use of an introduction element to introduce the metal material having at least a loading plane which is selectively mobile, in order to be inserted into the melting furnace, during the first step when the melting cycle is started with the furnace switched off, in order to unload into the furnace a desired quantity of metal and/or non metal material which makes up the first charge of the furnace.

BACKGROUND OF THE INVENTION

Transformation and melting plants for metal charges are known, of the continuous charge type, which comprise an electric arc furnace suitable to collaborate with transport means of the linear conveyor type. The electric furnace provides at least a container, or hearth, and a covering roof. The electrodes are placed through suitable holes in the roof. A further hole, technically denominated the fourth hole, is normally provided in the roof for the extraction of the fumes.

The continuous conveyor means can be of the vibrating type in order to allow the charge to advance, and cooperate with the electric furnace on one side and with a scrap loading system on the other.

The last segment of the conveyor means normally consists of an independent conveying segment, hereafter called connection conveyor, associated with translation means, which may consist of a mobile slider or any other means of translation suitable for its operating positioning.

The translation means are suitable to create the desired connection between the continuous conveying means of the charge and the lateral introduction aperture of the metal material into the electric furnace. The front end of the connection conveyor is positioned flush with the inside wall of the furnace, for example in the continuous scrap loading step, or distanced from it, for example in the tapping step, when the furnace is inclined in order to tap the liquid metal.

When the end of the connection conveyor, associated with the translation means, reaches the inside wall of the furnace, the vibration imparted thereto determines the advance and the subsequent fall of the scrap inside the furnace. When, on the other hand, the connection conveyor is distanced from the furnace, the vibration is stopped, so that the scrap possibly present therein does not advance.

It is known that solutions of the continuous charge type use a loading system with baskets in order to carry out the first start-up load with the furnace switched off, in order to create on the bottom of the furnace a mass of metal material to be melted when the cycle starts. Normally the quantity of material introduced with the basket is the amount necessary to define the so-called "liquid foot", that is, the quantity of liquid metal which is always kept inside the furnace even after tapping.

The use of the basket to carry out the first charge is determined by the fact that the switching on and start-up of the furnace require that the bottom of the hearth is covered by material that is sufficiently well distributed.

The use of a basket to carry out the first charge, although on the one hand it satisfies this need, on the other hand it makes the whole melting cycle more complex, in that it requires the use of specific equipment, such as the basket, the filling systems, the transport systems, a suitable storage zone etc., which are used for only a small fraction of the cycle, remaining idle for the rest of the melting cycle. Moreover, since the use of the basket means the scrap is loaded from above, the electrodes must first be completely extracted and moved to the side, the furnace roof must be opened and then the roof must be closed again and the electrodes re-introduced.

The cycle therefore becomes longer, due to the times needed for the first loading step, and the whole system becomes more onerous in terms of time and cost, it requires more equipment used, more operations to be carried out and coordination between a typical discontinuous loading step and the typical continuous loading steps.

The document U.S. Pat. No. 3,211,304 describes a furnace of the Martin-Siemens type in which a discontinuous loading system is provided which uses a longitudinally mobile container inside and outside the furnace.

The container, placed in a position outside the furnace, is loaded from above with the material, for example scrap, to be introduced into the furnace, and then progressively moved to the inside of the furnace.

Together with the container, in the direction it enters into the furnace, a barrier element moves, which, in the innermost position in the furnace, is also positioned inside the furnace.

When the container is retreated, on the contrary the barrier element remains stationary, so that the scrap is stopped by the barrier element which causes it to fall inside the furnace.

This solution therefore provides a discontinuous loading procedure using a longitudinally mobile container inside and outside the furnace, but it does not provide any type of continuous loading with vibrating conveyor.

The loading method provided by U.S. '304 can unload scrap only during the retreat of the container. Moreover, since the loading of the scrap is determined by a fixed barrier element, the unloading modes depend only on the distribution of the scrap on the container, and can in no way be controlled so as to define a desired distribution of the scrap inside the furnace.

With the device in U.S. '304 the scrap tends to accumulate in the part of the furnace near the entrance where the container is introduced, that is, in the fixed point where it stops and the barrier element, which causes the scrap to fall inside the furnace, is held stationary.

Purpose of the present invention is to solve the problems described above, eliminating the need to resort to a basket even for the first charge, and using for this operation the same equipment which is then used in the continuous load step when the furnace has been started.

The Applicant has devised, tested and embodied the present invention to overcome the shortcomings of the state of the art and to obtain these and other purposes and advantages.

SUMMARY OF THE INVENTION

The present invention is set forth and characterized essentially in the independent claims, while the dependent claims describe other innovative characteristics of the invention.

The present invention is applied in an electric arc melting furnace having means to feed the charge of a continuous conveyor belt type, or of the vibrating channel type, or of any other type able to carry out the same task, hereafter denominated main conveyor, associated with a connection conveyor, disposed as the independent terminal part of the main conveyor and able to cooperate with the inside of the furnace.

By connection conveyor, here and hereafter in the description and claims, we mean any element which is autonomously mobile and/or movable in a longitudinal direction, which can be associated with continuous feed means of the charge, which comprises at least a loading plane which can be moved, translated linearly or rotated, in order to assume different positions between the exit of the charge feed means and the aperture on the lateral wall of the furnace for the introduction of the charge inside the furnace.

As we said, therefore, the connection conveyor is associated with movement means thereof which allow to make the front end of its loading plane assume at least two positions with respect to the proximal internal wall of the melting furnace, that is to say a first loading position, assumed at least during the continuous loading step, in which said front end is located substantially flush with the internal wall of the furnace in order to introduce the charge continuously inside the furnace, and a second position distanced from the wall of the furnace and external thereto, assumed at least during the tapping step of the liquid metal from the furnace.

According to the invention, the front end of the loading plane of the conveyor also has a third operating position, assumed in order to carry out the first charge of the furnace too, when the furnace is switched off, in which it is positioned inside the volume of the furnace so as to be disposed in a position of proximity with respect to the distal internal wall opposite the proximal internal wall, in order to unload and distribute inside the furnace a quantity of charge such as to cover at least part of the bottom surface of the furnace.

By position of proximity to the distal wall we mean a position in which, operatively and possibly in combination with operative stratagems, as will be better seen hereafter, the disposition inside the furnace of the loading plane of the connection conveyor is such that a satisfactory distribution of the loading material on the bottom of the hearth of the furnace is obtained.

In a preferred solution, the position of proximity is comprised between an ideal center line of the inner volume of the furnace and the distal internal wall opposite the proximal internal wall where the loading plane is introduced.

Therefore, with this solution, even the first charge of the furnace, carried out with the furnace switched off, is executed with the same equipment used for continuous loading, without requiring basket systems or other systems which are used in the state of the art to carry out this first charge.

In one solution of the invention, the loading plane of the connection conveyor is associated with a vibration system which allows to unload into the furnace the material disposed on the loading plane, and to distribute it onto the bottom surface of the hearth of the furnace.

In another solution of the invention, the loading plane of the connection conveyor is associated with an inclination system, forward and/or lateral, which is selectively driven in order to promote the unloading of the charge material disposed on it.

In another solution of the invention, the loading plane of the connection conveyor has trap doors which can be selectively opened/closed, for example by activating hatches or similar, by means of which apertures the loading material can be unloaded, as well as from its front end, also from intermediate portions of the loading plane.

In another solution of the invention, the unloading of the material transported on the loading plane of the connection conveyor occurs during the advance of the loading plane inside the furnace.

In further solutions of the invention, the unloading of the material disposed on the loading plane of the connection conveyor can occur:
 only during the retreat of the loading plane;
 both during the advance of the loading plane and during its retreat;
 with the loading plane stationary inside the furnace, using one and/or the other of either vibrating the loading plane, inclining it forward or laterally, and/or the selective opening of trap doors or similar.

The distribution of the charge material can be regulated as desired, depending on the particular operating needs which might arise, for example the type of scrap, its sizes, type of melting process etc., by acting on the vibration parameters of the conveyor, on the speed of its advance and/or retreat, on temporary stoppages in the longitudinal movement with a simultaneous accentuation of the vibrating movement in order to unload a large quantity of scrap in a defined zone, or a reduction or stoppage of the vibration in order to prevent the scrap falling in zones where the quantity unloaded has to be less or even none at all.

Therefore the solution according to the invention allows to have great flexibility as it is possible to carry out the first charge of the furnace in a differentiated manner, distributing the desired quantity of charge in the various zones of the furnace.

In a further solution of the invention, an oscillation movement of the hearth of the furnace is associated with an advance of the loading plane of the connection conveyor, in order to further improve the distribution of the metal material unloaded onto the bottom of the hearth of the furnace.

In another solution of the invention, for the first charge of the furnace as described above, shredded or fragmented scrap is used, with the advantage that it guarantees a better filling and a better distribution on the bottom surface of the furnace, and also makes it melt quicker at the moment the furnace is switched on.

In yet another solution of the invention, for the first charge and/or continuous charge, coal and/or other specific additives are used, either by itself or mixed with the metal material. The coal, for example, has the function of carburizing the bath of liquid metal and to quickly form a foamy slag which, covering the electric arc, protects the refractory of the hearth from the action of the arc itself. This allows to increase the operative length of the refractory in efficient operating conditions.

In a further solution of the invention, the fumes deriving from the melting do not hit the metal material disposed on the connection conveyor and/or on the main conveyor, and therefore the scrap is not subjected to any pre-heating while it is being introduced inside the furnace. In this way, it is possible to eliminate the need for the cooling water which is used in the usual feeding systems with tunnels to pre-heat the scrap, with consequent simplification of the plant and reduced maintenance which lead to a considerable economic saving.

In another solution of the invention, dynamic sealing means associated with the connection conveyor are provided in order to prevent the hot fumes coming from the volume of the furnace from hitting the scrap on the connection conveyor and on the main conveyor and from exiting into the atmosphere.

In a further solution of the invention, the dynamic sealing means are associated with ventilator means and/or valve means having the function of balancing the pressure between the inside of the furnace and the atmosphere above the scrap in the connection conveyor and in the main conveyor, with the purpose of preventing the passage of hot fumes in contact with the scrap present therein.

BRIEF DESCRIPTION OF THE DRAWINGS

These and other characteristics of the present invention will become apparent from the following description of a preferential form of embodiment, given as a non-restrictive example with reference to the attached drawings wherein.

DETAILED DESCRIPTION OF A PREFERENTIAL FORM OF EMBODIMENT

With reference to the attached drawings, the number 10 denotes in its entirety a device to feed a metal charge, denoted generally by the reference number 35, into an electric arc melting furnace 11, comprising a hearth 12 and a roof 13.

Figure 1:
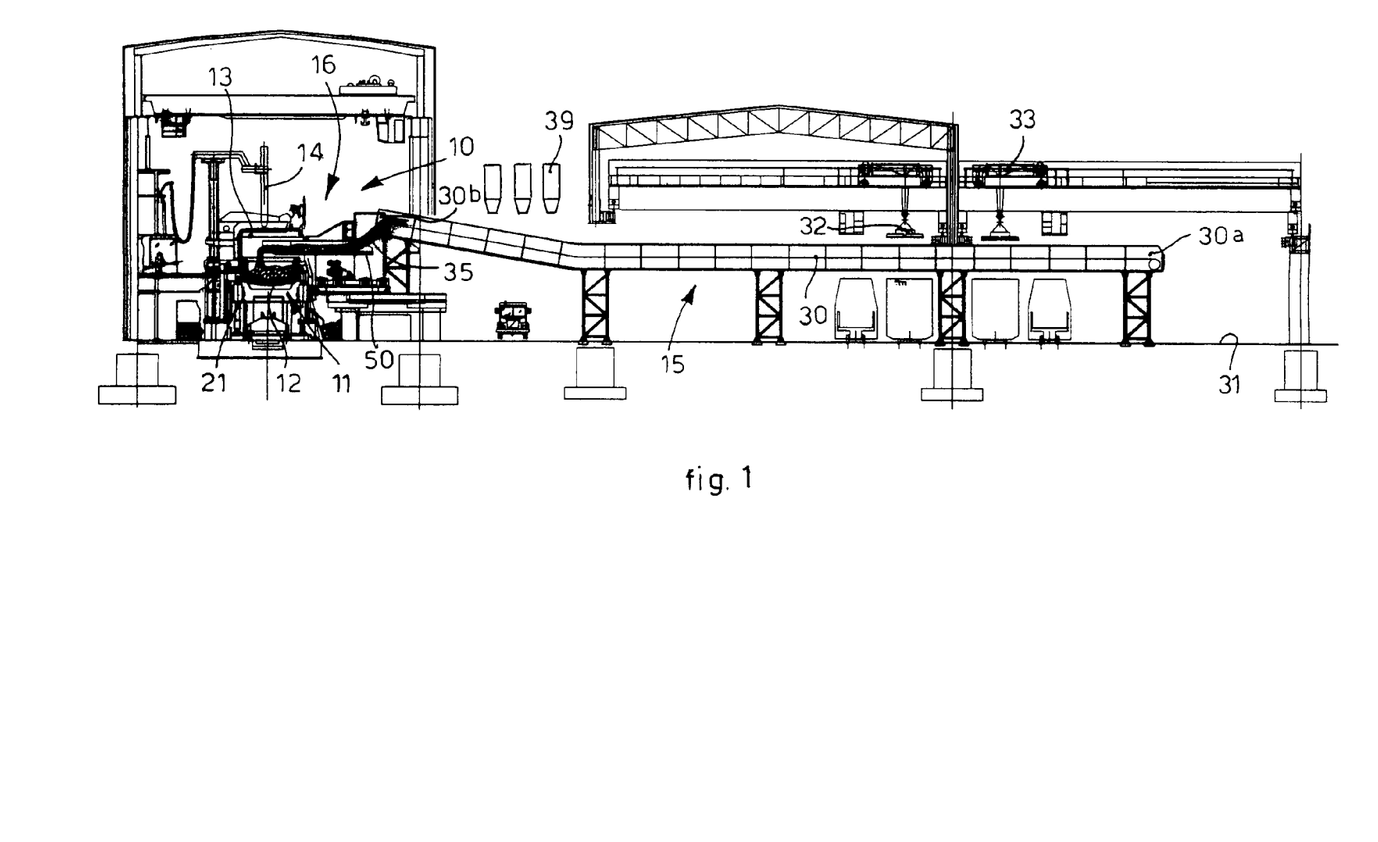
FIG. 1 shows a view of the overall lay-out of the melting plant in which the loading device according to the present invention is used.

The feed device 10 consists of a main conveyor 15, which in the case of FIG. 1, simply to give an example, consists of a slatted belt 30 which has the advantage, thanks to its great strength, of being able to receive the charge material directly from orange peel grapples, spider grapples or magnets 32, moved by gantries 33 as seen in the drawing.

Other types of continuous conveyor belt come within the field of the present invention, hereafter called simply "belt", such as for example a flexible belt made of steel or of rubber with a steel core, or a rigid belt with step-wise movement, or a track, or any other analogous or similar solution.

The main conveyor 15 is associated at the front with a connection conveyor 16, which determines the selective connection to the melting furnace 11.

The connection conveyor 16 has a loading plane 50 and a static cover to take in the fumes 18 associated therewith, and it is linearly mobile for the purposes and the functions shown in greater detail hereafter.

As said before, other solutions for connection conveyors 16 come within the field of the present invention, examples of which will be described hereafter with reference to FIGS. 2, 3 and 5.

The belt 30 transports the metal material 35 from a scrap storage zone 31, shown as an example only in FIG. 1, where magnets 32, or orange peel grapples or spider grapples, or other similar elements, moved by respective gantries 33, unload the material onto the belt 30.

In a solution not shown, the charge material can be unloaded first onto a vibrating transporter, disposed upstream of the belt 30, and the vibrating transporter then unloads the material on the back end 30a of the belt 30.

The metal charge material 35 is transported by the belt 30 as far as a zone in proximity to the furnace 11, in which it is transferred by means of a slide 36 (shown in FIGS. 2 and 3) from the front end 30b of the belt 30 onto the loading plane 50 of the connection conveyor 16.

By front end 30b and back end 30a of the conveyor belt 30 we mean the ends nearest and furthest respectively from the melting furnace 11.

The use of the conveyor belt 30 as main conveyor allows to obtain a plurality of advantages, the main ones being the following:

the length of the conveyor belt substantially has no limitations;

the simplicity of the conveyor belt makes maintenance operations simpler and less frequent;

the powerful foundations needed for a transporter of the vibrating channel type are substantially eliminated, and therefore installation and starting operations are simplified.

Moreover, the use of a main conveyor with a belt has the advantage, compared to other loading systems, of allowing a quicker and wider speed adjustment.

For example, when, after having carried out the first loading of the scrap, the continuous charge of the scrap starts, the belt can vary its speed to transport the scrap depending on the overall weight inside the furnace (liquid metal plus scrap). The weight can be detected, for example, by means of load cells.

The feed speed of the belt can be advantageously regulated on-line and continuously according to the input of the load cells, so as to effect a constant feed in weight without undesired alterations. In this way, the non-uniformity in weight (due to the loading mode of the belt) of the scrap on the belt is adapted to the quality and to the density of the scrap.

The belt thus becomes a flexible system which allows to maintain the ideal content of scrap more easily inside the furnace, which ideal content is defined by the melting process, thus saving energy, optimizing the wear of the electrodes and improving the so-called tap-to-tap time, that is, the overall time of the cycle.

Different solutions also come within the field of the invention, wherein the metal material 35 is directly unloaded by means of gantries, cranes or any other system, even discontinuous, onto the loading plane 50 of the connection conveyor 16, so that the main conveyor 15 will coincide on each occasion with one of the above solutions.

In FIG. 1 hoppers 39 are also shown, by means of which coal or similar material, for example combustible solids in general or additives of other types, such as for example slag formers, lime or ferroalloys, are unloaded onto the conveyor belt 30. The hoppers 39 unload the material onto the front part of the conveyor belt 30, or even directly onto the connection conveyor 16, until the material is unloaded into the furnace 11 or in the first loading step, in the modes described hereafter, or during the continuous loading of the scrap, in combination or not with the scrap itself. In particular, the coal has the function of carburizing the bath of liquid metal inside the hearth 12, and to promote the formation of a foamy slag which, covering the electric arc, protects the refractory of the hearth 12 from the action of the arc, thus increasing the duration thereof.

From the loading plane 50 of the connection conveyor 16 the metal material 35 is unloaded inside the melting furnace 11, with the modes explained hereafter.

Figure 2:
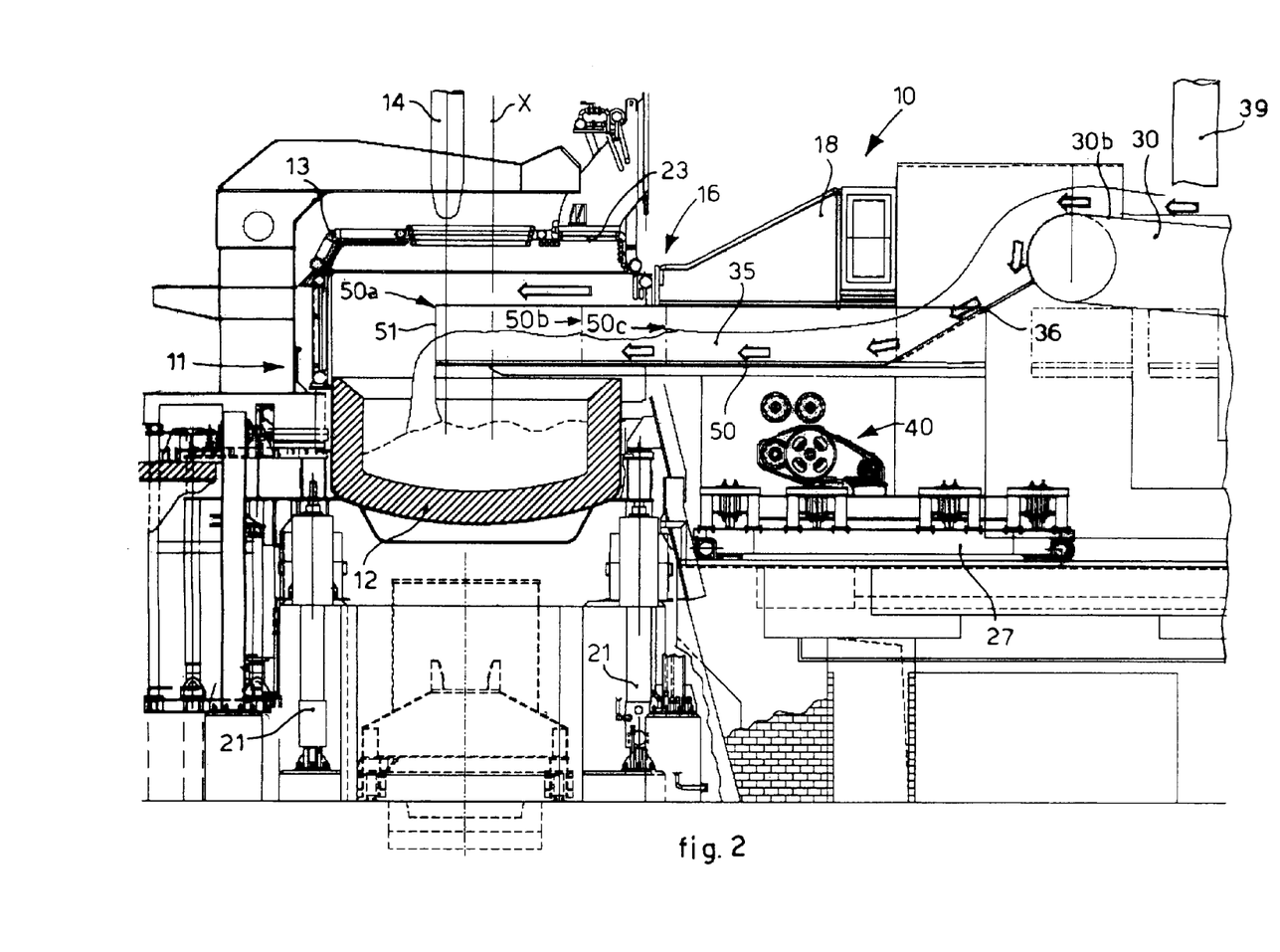
FIG. 2 shows, with a detail from FIG. 1, the loading device according to the invention associated with a melting furnace.

In the solution in FIG. 2, thanks to the movement of the mobile slider 27, the loading plane 50 of the connection conveyor 16 can assume at least three positions with respect to the lateral wall of the melting furnace 11, which are:

a first advanced position 50*a*, indicated with a continuous line in FIG. 2, in which its front end 51 is positioned beyond the median axis X of the melting furnace 11; this position is assumed in the first loading step of the furnace 11, with electrodes 14 raised and at least partially extracted from the roof 13, and with the furnace switched off;

a second position 50*b* (indicated by dashes) in which the front end 51 is positioned substantially flush with the inside lateral wall of the furnace 11; this position is assumed during the usual continuous loading steps of the furnace 11, in which the metal charge 35 is transferred continuously from the main conveyor 15 to the connection conveyor 16 in order to be unloaded continuously inside the furnace;

a third position 50*c*, also indicated by dashes in FIG. 2, in which the loading plane 50 is brought into a position of non-interference with the external wall of the melting furnace 11, for example 1 meter distant from it, when the latter is made to oscillate in order to carry out the tapping operations of the melted metal.

The movement of the slider 27 therefore allows the connection conveyor 16 to move forward and backward, even a few meters, with the purpose of disposing the relative loading plane 50 in the three positions.

The slider 27 also supports, in a known way, an eccentric masses system, denoted in its entirety by the reference number 40, which masses have the function of determining, by means of the induced vibration, the progressive advance of the metal material 35 on the loading plane 50 and therefore its unloading inside the melting furnace 11.

Even if the description of the preferential solution refers to a slider 27 which moves in a direction substantially coincident with the longitudinal axis of the main conveyor 15, the teaching of the invention can also be extended to solutions in which the connection conveyor 16 is mounted on an arm, on a gantry, or on any other suitable translation means, and moves with respect to the wall of the furnace 11 in a slanting direction with respect to its longitudinal axis.

Some examples of these alternative solutions are supplied, as said, in FIGS. 3 and 5, in which the same reference numbers are attributed to equal or equivalent elements already described with reference to FIGS. 1 and 2, and such elements will not be described again.

Figure 3:
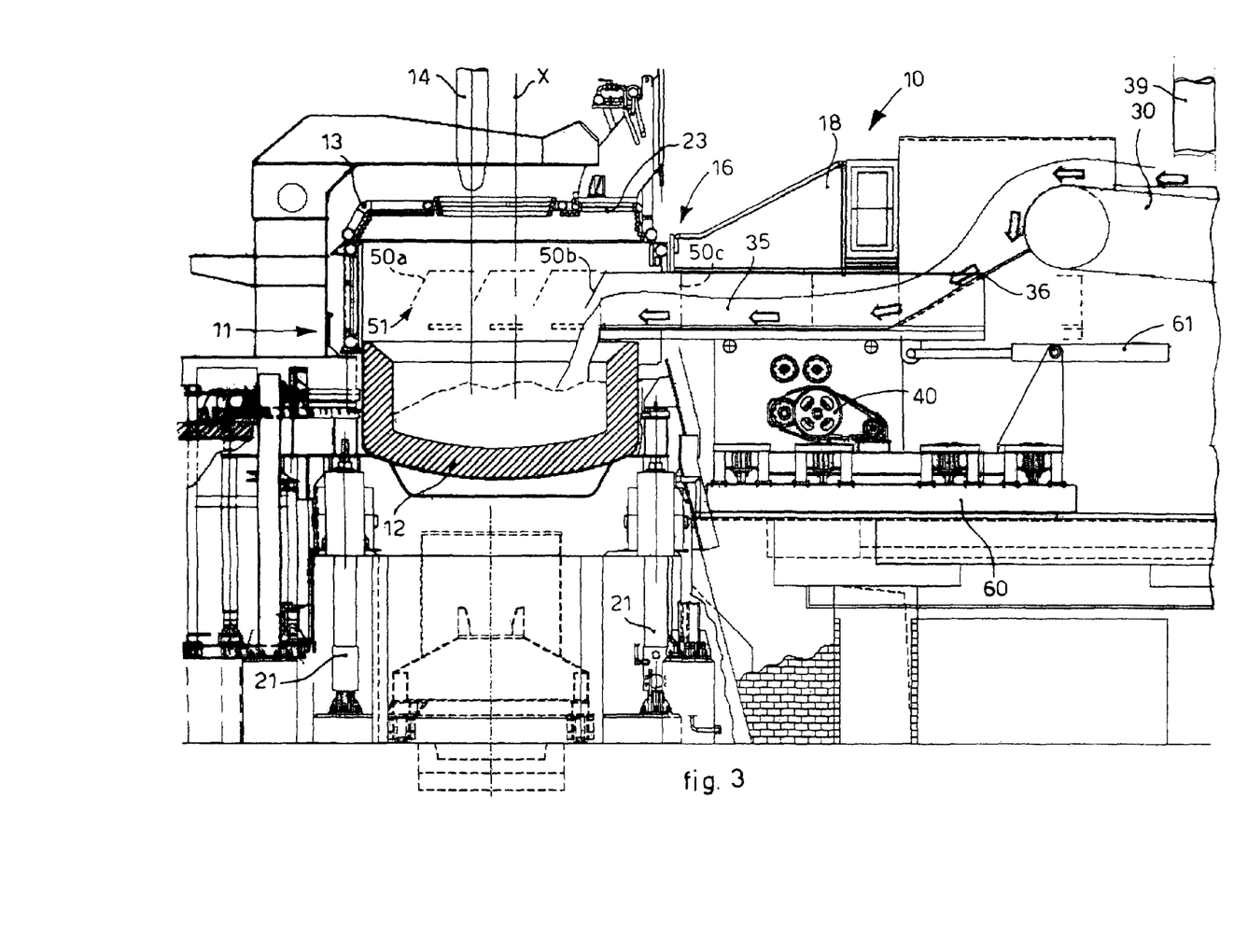
FIG. 3 shows a variant of FIG. 2.

In particular, FIG. 3 shows a solution in which the connection conveyor 16 is mounted on a fixed base 60, and has its loading plane 50 associated with a linear movement hydraulic cylinder 61 which determines the movements toward and away from the furnace 11, in relation to the loading steps to be carried out and as described above. In this case too, the loading plane 50 can be associated with a vibrating system 40, for example of the eccentric masses type or of a different type, which makes the loading plane 50 vibrate and promotes the fall and the distribution of the charge material 35 inside the furnace 11.

Alternatively, or in association with this vibrating movement, the charge material 35 can be made to fall by means of a sudden and quick retreat of the loading plane 50, obtained by a suitable drive of the hydraulic cylinder 61, or possibly also by means of rapid forward and retreat sequences of the loading plane 50 which cause the material 35 to fall.

Figure 5:
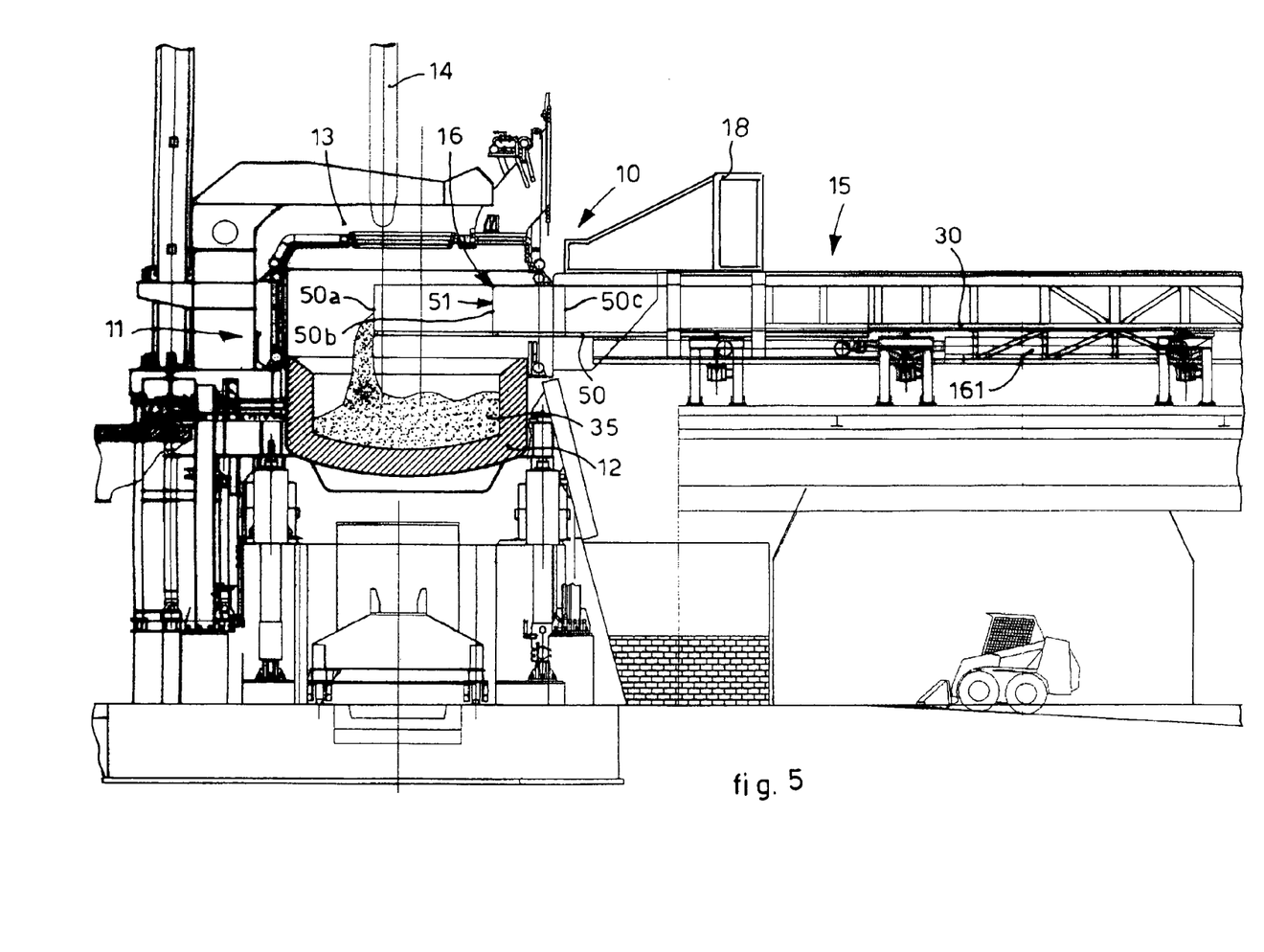
FIG. 5 shows another variant of FIG. 2.

According to the further variant in FIG. 5, the connection conveyor 16 is obtained by providing a loading plane 50 which develops as a mobile appendix of the main conveyor 15, in this case consisting of a vibrating channel. The loading plane 50, which vibrates together with the main conveyor, can be selectively moved, in this case telescopically with respect to the main conveyor 15, by means of a hydraulic cylinder 161 or other means suitable for the purpose.

This solution has the advantage, compared to the one described before, that it frees the area adjacent to the furnace immediately next to the lateral aperture 17 where the charge is introduced, which can be affected by a leakage of slag. Moreover, the operation to discharge and remove the slag is also facilitated, and all the operations which can affect the lateral aperture and its maintenance in conditions of efficiency.

In this case too, the charge material 35 can be made and/or facilitated to fall by a sudden retreat movement, or retreat/advance, of the loading plane 50.

Thanks to the varied solutions so far described, and thanks to the use of a loading plane 50 of a certain length, for example about 9 meters in the case of melting furnaces 11 having a diameter of about 4 meters, it is possible to insert in depth the front end 51 of the loading plane 50, at least as far as beyond the center line of the inner volume of the furnace 11 defined by the axis X, with the purpose of unloading and distributing the metal material 35 inside it.

The position of the front end 51 of the loading plane 50 can also reach the opposite distal internal wall of the furnace 11 with respect to the proximal internal wall through which the loading plane 50 is introduced, in relation to the need to distribute the material disposed on the loading plane 50 in a more or less uniform way during the first loading.

The loading plane 50, according to solutions not shown, can be associated with inclination means in order to impart a desired inclination thereto, at least forward and/or lateral, with the purpose of assisting or substituting the vibrating action, where it is provided, in order to cause the loading material to fall inside the furnace 11.

The unloading of the metal material 35, in the first loading step with the furnace switched off, can occur during the forward movement of the loading plane 50 inside the furnace 11, that is, with a movement of the slider 27 from right to left as shown in FIG. 2. As has already been explained, the advance and then the unloading of the metal material 35 from the front end 51 of the loading plane 50 can occur by vibration. In addition, combined with the advance of the loading plane 50, the hearth 12 can be made to oscillate, using the usual hydraulic cylinder systems 21, so as to distribute the unloaded metal material 35 more uniformly, if necessary, and to cover the whole bottom surface of the furnace 11.

Advantageously, even if not necessarily, the metal material 35 unloaded for the first charge with the furnace switched off is fine material, shredded or fragmented, having a greater apparent density, so as to achieve a better covering of the bottom of the furnace 11 and accelerate the first melting step.

All the metal material 35 needed for the first charge, which advantageously serves to create the so called "liquid foot" maintained inside the furnace during the whole melting cycle, is unloaded into the volume of the furnace 11 during the advance or retreat, or the combination of these two, of the loading plane 50. When the unloading step of the first charge has finished, the front end 51 of the loading plane 50 is positioned substantially flush with the inside wall of the furnace 11.

The subsequent step provides to lower the electrodes 14 inside the furnace 11, to switch it on, to start the melting first of all of the metal material 35 unloaded in the first charge, and then to start the continuous loading process, activating the main conveyor 15 together with the connection conveyor 16.

The loading plane 50 is advantageously associated, at least for a segment thereof which comprises its front end 51, with cooling systems having bundles of tubes of the known type, in which a cooling liquid circulates.

Figure 4:
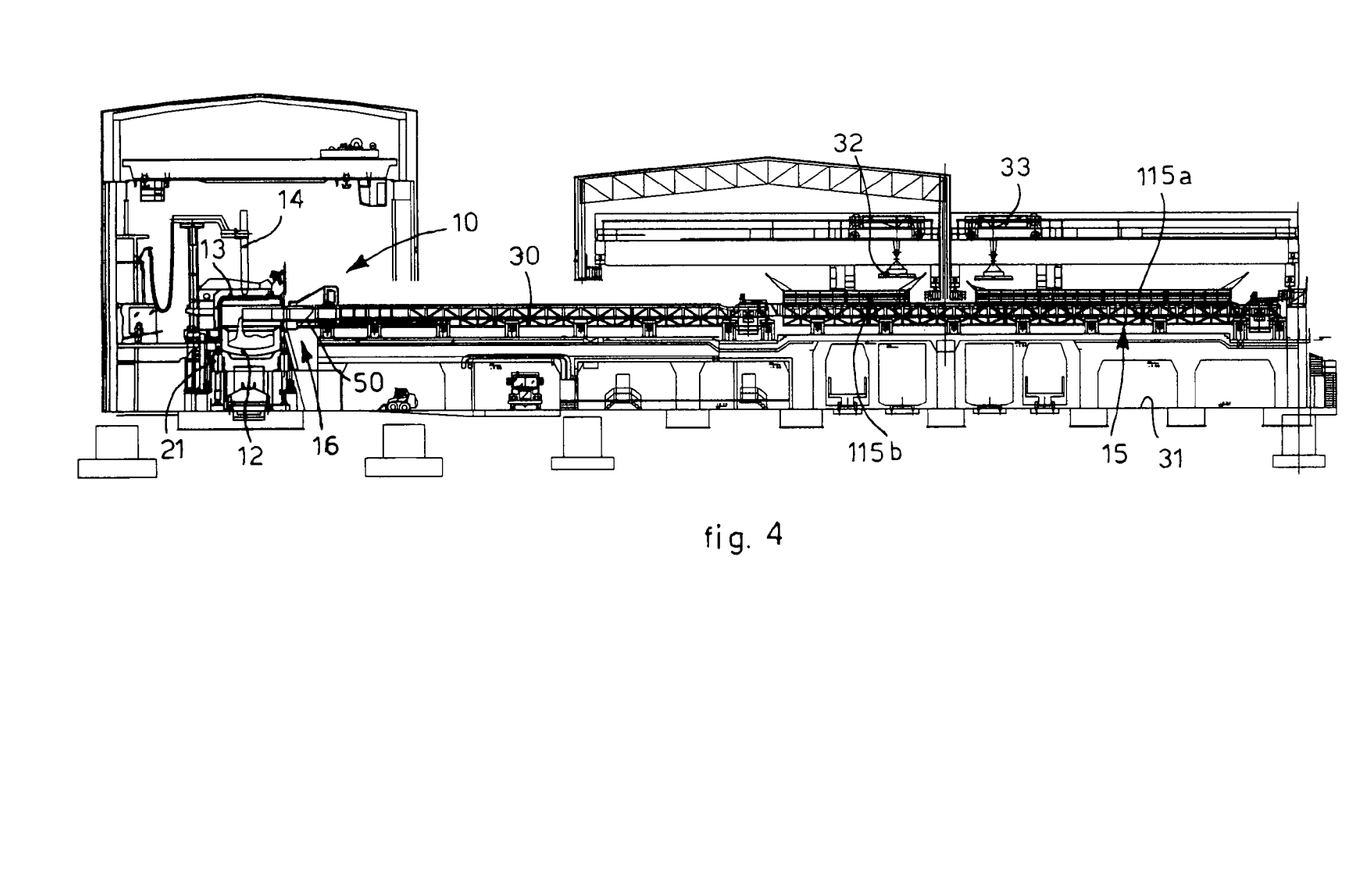
FIG. 4 shows a variant of FIG. 1.

The variant shown in FIG. 4, where the same numbers are given to equal or equivalent components to those already described with reference to the previous drawings and which will not be described here again, provide a main conveyor 15 consisting of two vibrating channels 115a and 115b, disposed in series with respect to each other, followed by a transporter 30 with a loading plane 50 of the telescopic type, for example of the type already described with reference to FIG. 5.

According to another feature of the present invention, the metal material 35 disposed on the main conveyor 15 and on the connection conveyor 16 is not hit by the hot fumes coming from inside the melting furnace 11, so that there is no preheating of the charge before it is introduced into the furnace.

The usual fume intake system by the fourth hole 23 of the furnace 11 is adopted for this purpose. Moreover, in order to reduce to a minimum the entrance of false air (shown by the reference number 41 in FIG. 7) which tends to enter from the lateral aperture 17 of the furnace 11, a further intake system is advantageously provided, called pneumatic-dynamic sealing system 26 and associated with the connection conveyor 16, in particular with its cover 18, shown schematically in FIGS. 6 and 7.

Figure 6:
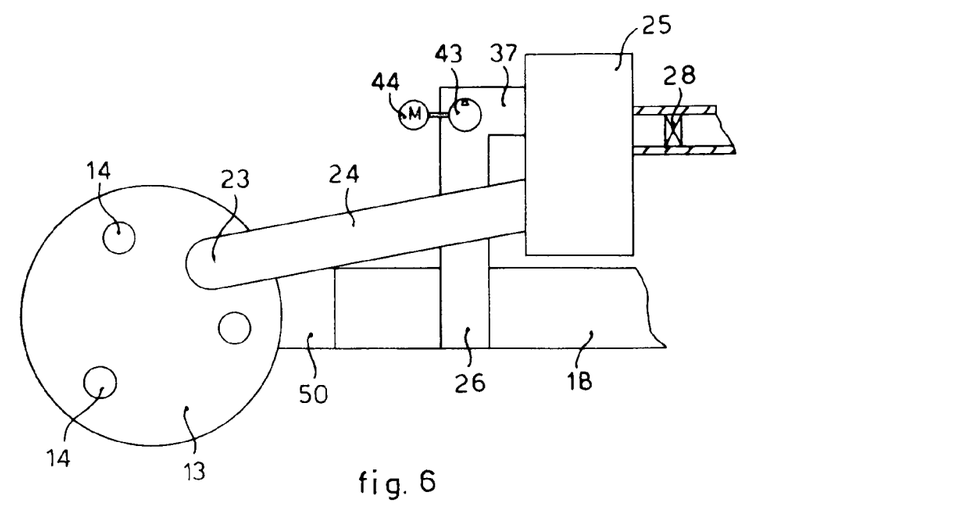
FIG. 6 shows a detail of the fume extraction system used in association with the loading device according to the invention.
Figure 7:
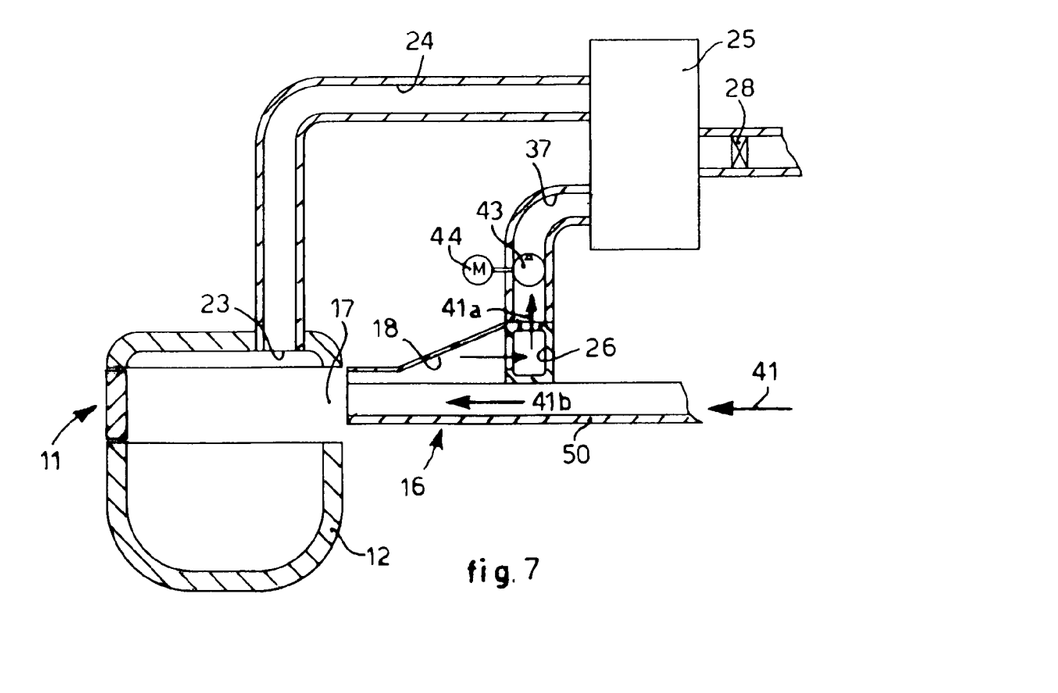
FIG. 7 shows schematically a further solution of the fume extraction system.

As shown, the false air 41 which enters from the rear end of the connection conveyor 16 is to a large extent taken in, for example to a quantity in the range of 80-90%, and discharged by the dynamic seal 26 (arrow 41a), while the remaining part 41b passes through all the remaining segment of the loading plane 50 and enters into the furnace 11, going to dilute the exhaust gases which exit from the fourth hole 23. For this purpose, the dynamic seal 26 is associated, in this case, with a ventilator 43, driven by a motor with variable revolutions 44, which allows to create the desired conditions of pressure/depression in order to ensure this effect on the false air 41.

In particular, the balance of the pressures can be such that the depression inside the furnace 11 is, in absolute terms, higher than the depression of the dynamic seal 26, so that the passage of the fumes from the lateral aperture 17 where the scrap is loaded is, to a large extent, inhibited.

The difference of pressure can be advantageously controlled and maintained automatically by a PLC which intervenes on the ventilator 43 with variable revolutions of the seal 26 or in another solution on a passive adjustment valve.

FIG. 3 shows schematically the fume discharge system which provides, on one side, the usual system which, by means of a pipe 24 associated with the fourth hole 23, takes the fumes from inside the furnace 11 and transfers them to a sedimentation chamber 25 through which, by means of the selective drive of a passive pressure adjustment valve 28, the fumes are sent to the fume plant system and to the chimney. The false air intake system described above is associated with the cover 18 of the connection conveyor, which comprises a pipe 37 through which the air taken in is introduced into the sedimentation chamber 25 and from there, through the valve 28, to the fume plant and to the chimney.

Modifications and variants may be made to the device and method to feed a metal charge as described heretofore, all coming within the field of protection defined by the attached claims.

The invention claimed is:

1. Device for feeding metal material into a melting furnace comprising a hearth and at least a lateral aperture, the device comprises:

feed means to feed the metal material terminally associated with a connection conveyor comprising a loading plane, longitudinally mobile and cooperating with translation and positioning means, the connection conveyor able to assume at least a first position at least during the continuous loading step of the metal material inside the melting furnace, in which a front terminal end of the loading plane is located substantially flush with the internal wall of the furnace through said aperture, to introduce the metal material inside the furnace, and a second position distanced from the wall of the furnace, assumed at least during a tapping step of the liquid metal from the furnace, the connection conveyor also has a third position, assumed in the step of first charge of the furnace, with the furnace switched off, in which a front end of a loading plane of the connection conveyor is positioned inside the volume of the furnace to be disposed in a position of proximity with respect to the distal internal wall opposite the proximal internal wall of the furnace, to unload and distribute a defined quantity of said first charge to cover at least part of the bottom surface of the furnace, wherein said connection conveyor is configured to unload the metal material of said first charge in adjustable quantities and positions, from one or the other of the front end of the loading plane, laterally to the loading plane, or also below the loading plane which is selectively openable.

2. Device as in claim 1, wherein the loading plane of the connection conveyor is associated with a vibration system, the activation of which allows to transport, unload and distribute in the melting furnace the metal material disposed on the loading plane from the front end of the loading plane.

3. Device as in claim 1, wherein the loading plane of the connection conveyor is associated with inclination means, activation of which allows to unload into the melting furnace the metal material disposed on the loading plane from the front end of the loading plane and/or laterally.

4. Device as in claim 1, wherein the loading plane cooperates with an upper cover of the connection conveyor.

5. Device as in claim 1, wherein the loading plane is mounted fixed on a slider selectively mobile toward/away from the wall of the furnace.

6. Device as in claim 1, wherein the loading plane is mounted on a fixed base and can be translated linearly toward/away from the wall of the furnace by means of at least an actuator.

7. Device as in claim 1, wherein the loading plane is made as an appendix of the main conveyor and is mobile telescopically with respect thereto, toward/away from the wall of the furnace.

8. Device as in claim 1, wherein the metal material unloaded for the first charge with the furnace switched off is fine material, shredded or fragmented, to achieve a better cover of the bottom of the furnace and to accelerate the first melting step.

9. Device as in claim 7, wherein the cover of the connection conveyor is associated with a system to take in the fumes and with a dynamic sealing system.

10. Device as in claim 1, wherein the feed means for the metal material comprise a flexible steel belt.

11. Method for feeding metal material into a melting furnace comprising a hearth, electrodes and having a lateral aperture, in which feed means are used terminally associated with a connection conveyor cooperating with translation and positioning means, the connection conveyor assuming at least a first loading position, during the continuous loading step, in which the loading plane has its front terminal end located substantially flush with the internal wall of the furnace to introduce the metal material continuously through said aperture into the furnace, and the connection conveyor assuming a second position in which the loading plane is distanced from the wall of the furnace, at least during a tapping step of the liquid metal from the furnace, first loading, with the furnace switched off, and electrodes at least partly removed from inside the furnace, in which the connection conveyor is positioned in a third position in which the loading plane is inserted inside the volume of the furnace with the front end of the loading plane in a position of proximity with respect to the distal internal wall opposite the proximal internal wall of the furnace where there is said lateral aperture, to unload and distribute a quantity of charge to cover at least part of the bottom surface of the furnace, and in which the metal material is unloaded from said connection conveyor during said first loading step, in adjustable quantities and positions, from one or the other of the front end of the loading plane, laterally to the loading plane or also below the loading plane which is selectively openable, and in which, after said first loading step, the connection conveyor positions the loading plane with its front end located substantially flush with the inside wall of the furnace to introduce the metal material continuously into the furnace during melting.

12. Method as in claim 11, wherein the metal material is unloaded during the advance step of the loading plane toward the inside of the furnace.

13. Method as in claim 11, wherein the metal material is also unloaded during a retreat step, or only during the retreat step, or also with the loading plane linearly stationary.

14. Method as in claim 11, wherein in the step of first charge, the hearth of the melting furnace is made to oscillate in a manner coordinated with the movement of advance or retreat of the loading plane, to improve the conditions of distributing the metal material inside the furnace.

15. Method as in claim 11, wherein in the melting step the fumes are discharged from inside the furnace through a fourth hole present in the roof of the furnace, to prevent said fumes exiting from the lateral aperture, hitting the metal material.

16. Method as in claim 11, wherein in the step of first charge is unloaded inside the furnace a quantity of coal and/or other additives, to generate, at the start of melting, a carburization of the liquid metal and to generate a foamy slag to protect the refractory material of the hearth.

* * * * *